(12) United States Patent
Valk

(10) Patent No.: US 6,643,818 B1
(45) Date of Patent: Nov. 4, 2003

(54) STORING AND USING THE HISTORY OF DATA TRANSMISSION ERRORS TO ASSURE DATA INTEGRITY

(75) Inventor: Kenneth Michael Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/443,521

(22) Filed: Nov. 19, 1999

(51) Int. Cl.$^7$ .................................................. H04L 1/00
(52) U.S. Cl. ........................ 714/776; 714/704; 359/110
(58) Field of Search ........................... 359/110; 714/704, 714/706, 776, 781–785, 758

(56) References Cited

U.S. PATENT DOCUMENTS

| | | | |
|---|---|---|---|
| 4,781,427 A | * 11/1988 | Husbands et al. | 385/24 |
| 4,884,266 A | * 11/1989 | Pflaumer | 370/545 |
| 5,073,940 A | 12/1991 | Zinser et al. | 381/47 |
| 5,465,260 A | 11/1995 | Zook | 371/37.7 |
| 5,528,607 A | 6/1996 | Weng et al. | 371/42 |
| 5,539,756 A | 7/1996 | Glaise et al. | 371/37.1 |
| 6,189,124 B1 | * 2/2001 | Glaise | 714/758 |

FOREIGN PATENT DOCUMENTS

| | | | | |
|---|---|---|---|---|
| JP | 5022256 | 1/1993 | | |
| JP | 07046261 A | * 2/1995 | | H04L/12/40 |
| JP | 7272411 | 10/1995 | | |
| JP | 2000036851 A | * 2/2000 | | H04L/29/08 |

OTHER PUBLICATIONS

INSPEC Abstract No. B9705–6120B–003, Kientzle, T., "Understanding CRCs", Dr. Dobb's Journal, Vol. 22, No. 4, pp. 103–107, 114–115 (Apr. 1997).

* cited by examiner

Primary Examiner—R. Stephen Dildine
(74) Attorney, Agent, or Firm—Karuna Ojanen

(57) ABSTRACT

A method and apparatus is disclosed which enhances the integrity of transmitted data or detects when random data is being received which might indicate that a receiver or a transmitter is open or that random data is otherwise being transmitted. A stream of data transmitted in packets having an error code associated with each packet is received into a receiver. The receiver has an error code checker to check the error code of each packet to determine if the data packet has been transmitted error-free. The results of the error checks for n sequential packets are stored in a shift register or counter. An incoming packet then undergoes an error code check and the results of the previous n sequential packets are considered. If a predetermined number of the previous n sequential packets has a transmission error n, then the method decides to reject or accept the error packet based on the quality of data integrity. When a 32-bit CRC error code is used, an 8-bit shift register is sufficient to prevent the acceptance of a packet of random data that may otherwise be accepted.

9 Claims, 3 Drawing Sheets

STORING AND USING THE HISTORY OF DATA TRANSMISSION ERRORS TO ASSURE DATA INTEGRITY

TECHNICAL FIELD

This invention relates generally to the field of digital and optical data transmission input into an electronic data communication system and more particularly, relates to an apparatus and method to store a history of the results of error detection for consecutive data packets to evaluate the integrity of incoming data packets.

BACKGROUND OF THE INVENTION

For reliable communications having data integrity in a digital data communication system it is necessary to be reasonably sure of detecting all transmission errors. In complex communication systems, such as computers having storage of data to and retrieval from electronic memory, optical media or magnetic media, and input/output (I/O) devices, etc. there may be many transmission networks. Errors in data transmission may occur as a result of noise, media defects, circuit failure, or a transceiver being left "open," to name only a few. Noise can result from some receivers, such as differential and optical receivers, which are powered but are not receiving any valid data. Environmental perturbations around these "open" receivers can fluctuate around the detection threshold for these receivers and so the receivers perpetrate noise into the communication system as random data.

One way of detecting errors in data transmission uses cyclic redundancy check symbols or CRCs. The data can be viewed as a sequence of binary bits or a sequence of multi-bit symbols. In general, a CRC is an additional code added to the data prior to data transmission. CRCs are calculated by treating the data as the coefficients of a polynomial and dividing the data by another polynomial and keeping the remainder. The data and CRC together make up a codeword which is then transmitted through the communication channel. At the receiving end of the channel a CRC is calculated independently from the received data. The calculated CRC is compared to the original transmitted CRC and a discrepancy between the two indicates a transmission error. In general a bit-oriented CRC is desired if the expected errors are random bit errors and a symbol-oriented CRC is desired if the expected errors are burst errors or random symbol errors.

Typically, most data transmission systems rely on CRC checking to determine if data has been accurately transmitted. For the most part, using CRC checking is sufficient to detect errors and discard data having such an error. Even when a data transfer protocol includes data integrity checks, such as CRC checking, however, random data eventually passes the CRC check causing erroneous data to be accepted as legitimate data. For example, if an open receiver produces random data and decodes a packet of that random data once every microsecond, then even a 32-bit CRC will accept an erroneous data packet having a matching CRC every 1.2 hours.

There is thus a need to increase the reliability of transmitted data in high speed communications systems.

There is also a need during data transmission to detect when random data is being transmitted, received, or generated. One source of random data, moreover, is an open differential or optical receiver which generates random data in response to environmental noise; so there is also a need to detect when a differential or optical receiver is in an "open" state so the data or the receiver can be gated.

SUMMARY OF THE INVENTION

These needs and others that will become apparent to one skilled in the art are satisfied by a method of error detection in the transfer of data, comprising the steps of receiving a data packet having an error detection code over a data link; checking the error detection code at a data receiver for an error in the transmission of the data packet; storing the history of the results of the error check; and repeating the steps of receiving the data packet, checking the error detection code and storing the results of the error detection code checking for n consecutive packets, where n>1; and if at least one of the n previous data packets indicates an error in the transmission of the data packet, then discarding the n+1 data packet.

The data may be optical data transmitted over a fiber optic channel. The data may also be electronic digital data. The error detection code may be a CRC code; and may even be a 32 bit CRC code.

If eight of the previous data packets indicate an error in the error detection code, then the method may determine that the transmitted data is random data.

Another embodiment of the invention is a data communication system comprising a processor connected to at least one data transmitter device for the transfer of data in packets having an error code to and from the data transmitter device, a receiver connected between the processor and the data transmitter device, the receiver having an error checker to check the error code for a data transmission error of each data packet; a shift register connected to the error checker to store the results of the error checker for each sequential data packet; and a packet receiver to accept a current data packet when not only does the current data packet have no data transmission error but also at least one of the previous data packets has no data transmission errors. The packet receiver may reject the current packet even though the current packet has no data transmission error but at least one of the previous data packets has a data transmission error.

The invention may further be considered an apparatus for assuring the integrity of data transmission, comprising means to receive a stream of data packets, each of the data packets having an error code; means to check the error code of each data packet as it arrives into said receiver to determine if there is a transmission error for each data packet; means to store the results of the error code checking means for n sequential packets; means to reject a current data packet when the current data packet has no transmission error but the error code checking means indicates that one of n sequential packets immediately transmitted before the current packet has a transmission error.

Further scope of applicability of the present invention will become apparent from the detailed description given herein. It should be understood, however, that the detailed description and the specific examples, while indicating preferred embodiments of the invention, are given by way of illustration only. Various changes and modifications within the spirit and scope of the invention will become apparent to those skilled in the art upon review of the detailed description.

BRIEF DESCRIPTION OF THE DRAWING

The present invention will become more fully understood from the detailed description and accompanying drawings, wherein.

DETAILED DESCRIPTION OF THE PREFERRED EMBODIMENTS

Figure 1:
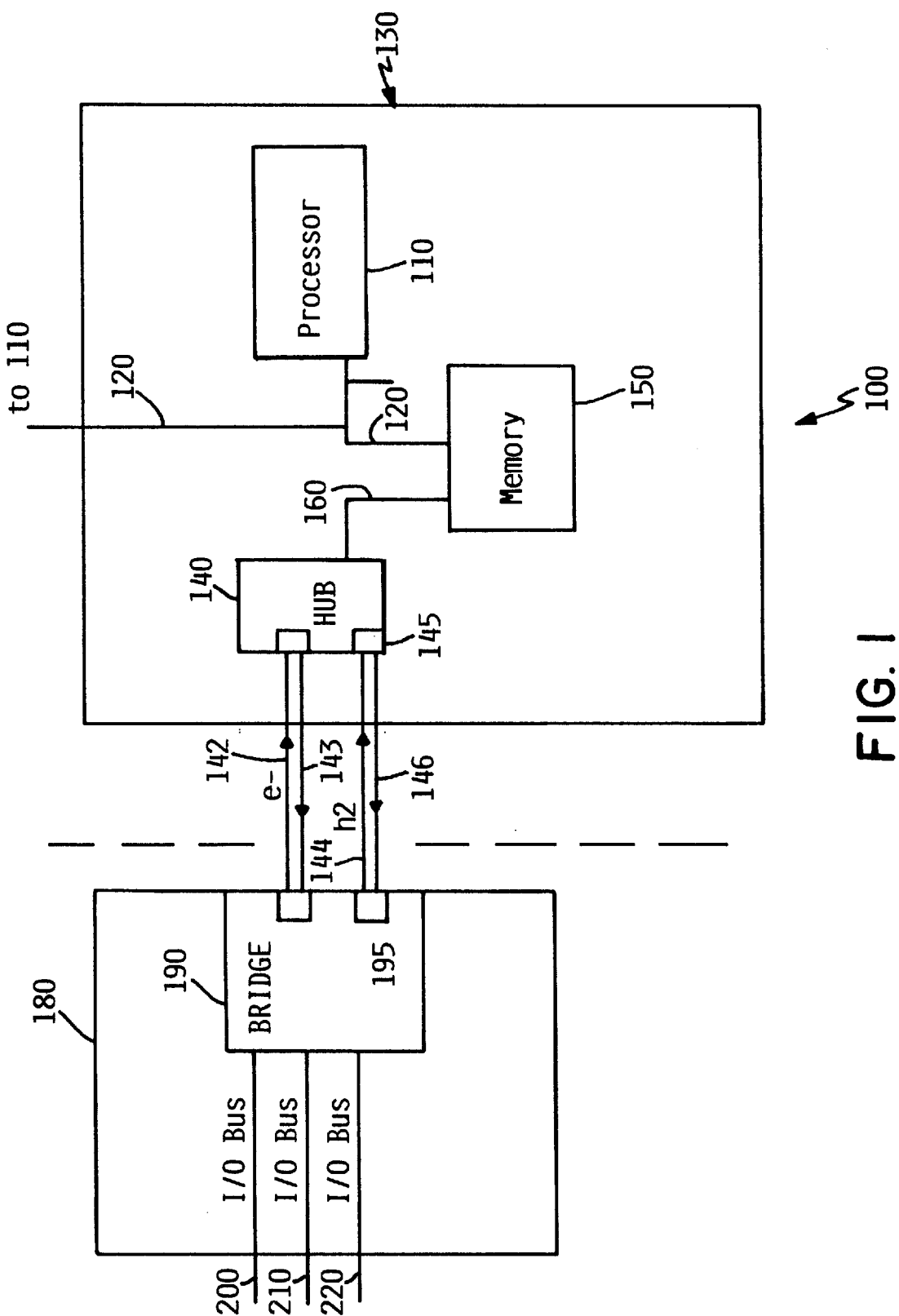
FIG. 1 is a simplified block diagram of a basic data communication architecture capable of implementing the invention.

Referring to the figures wherein like numerals refer to the same or similar elements throughout and in particular with reference to FIG. 1, a simplified block diagram of a computerized data communication system 100 which may have more than one processor system 130, of which only one is shown. Processor system 130 typically comprises at least one processor 110 having multiple functional units to perform arithmetic and logical operations on data via instructions. An example of a processor is the PowerPC which uses a reduced instruction set architecture. Processor 110 may be connected to other system processors 110 using an internal bus network 120. The processor system 130 has main store memory 150 typically comprising an array of memory cards which interact with the cache system (not shown) of the processor 110 on an internal bus 120 and with I/O devices on an external bus 160. External bus 160 may be attached to a hub controller 140 which is a data traffic controller for digital data or optical data on one or more buses 142, 143, 144, 146 to/from intermediate communication circuits on a bridge chip 190 in an I/O tower 180. I/O tower 180 may have multiple bridge chips 190 connected to many external I/O buses 200, 210, 220. External I/O devices are connected to external buses 200, 210, 220 having standardized and/or unique data protocols, such as Ethernet, PCI, TCP/IP, etc. Other examples of the external I/O buses and devices to which an external I/O bus may be connected include a limited network within a business or home, different media for storage of data, a specified configuration of servers and client computers, or an unlimited network such as the Internet.

Figure 2:
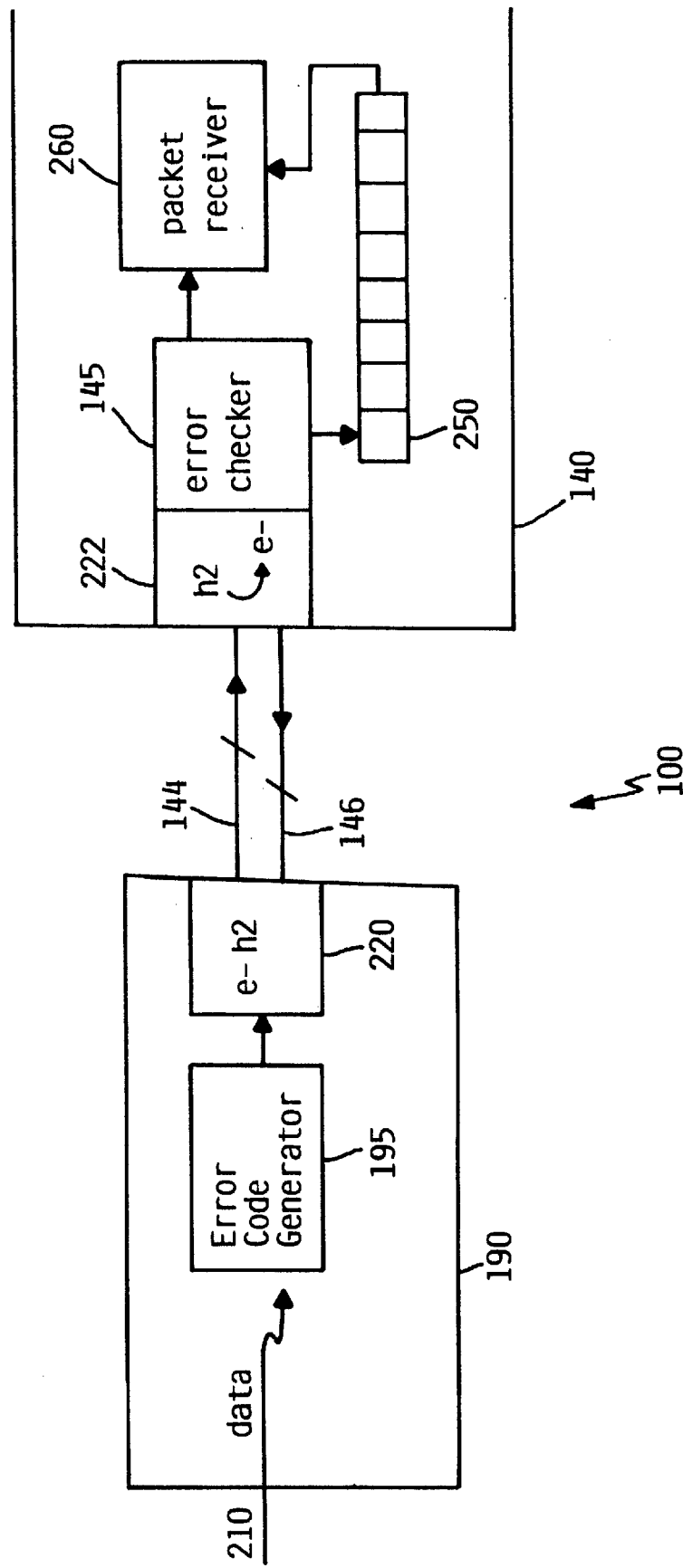
FIG. 2 is a simplified block diagram of a data integrity system using a CRC shift register in accordance with principles of the invention. It is suggested that FIG. 2 be printed on the cover of the patent.

FIG. 2 is a simplified block diagram of certain hardware features of the FIG. 1 that take advantage of the invention. A data stream may originate from an external I/O source on an I/O bus 210 and is usually received into a bridge chip 190. Although presented herein as data arriving from an external source to the data communications system 100, the invention also applies to the transfer of data entirely within a data communication system. Bridge chip 190 has an error code generator 195 to generate an error code to attach to a data stream. In an embodiment, the error code generator 195 is a 32-bit CRC error code generator. The data stream then is converted to optical data in an optoelectronic transceiver 220 and is transmitted to the hub controller 140 over a fiber optics link 144. The hub controller 140 receives the optical data and converts the data to electronic digital data in another optoelectronic transceiver 222. The electronic digital data is then received in a corresponding error checker 145 for verification of correct data which in the embodiment presented is a 32-bit CRC error checker. A history of the results of the error checker 145 for the previous eight packets is stored in a shift register 250. The result of the error checker 145 and the history of the previous eight packets stored in shift register 250 are forwarded to the packet receiver 260 for further processing by the hub controller 140 and other aspects of the data communication system 100. Although a shift register has been used in this particular embodiment, other techniques to count or keep track of the number of packets and their transmission error status can be implemented, such as a counters. It is to further understood, that the methods taught herein are not limited to data transfer between a bridge chip 190 to a hub controller 140 but are applicable to any data receiver in any data communication system which checks the integrity of data transmission with an error code.

Figure 3:
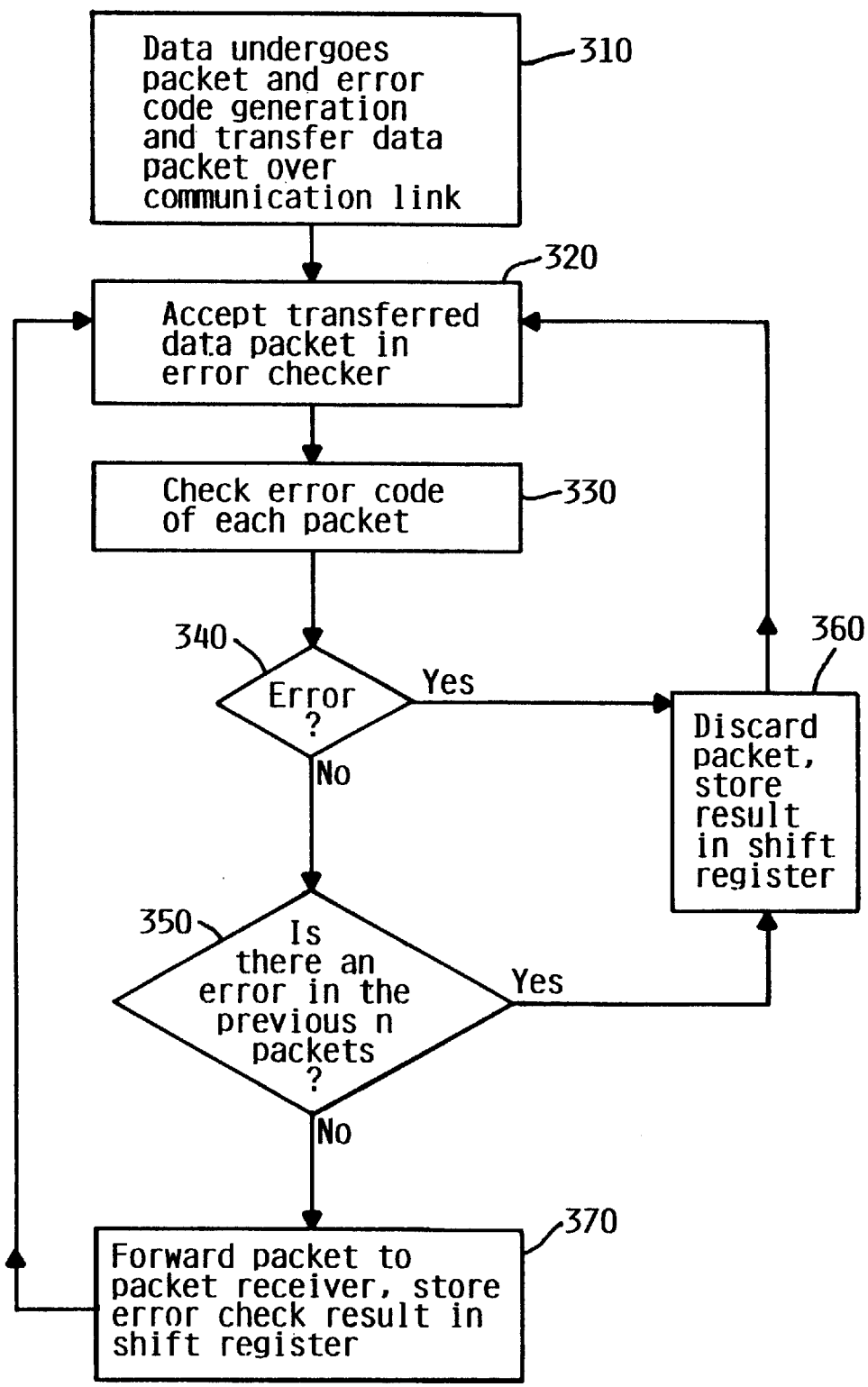
FIG. 3 is a simplified flow chart of the method to store the history of data transmission errors in accordance with principles of the invention.

The principles of the operation of the invention are as follows and are presented in a simplified flow diagram of FIG. 3. An error code is generated in the error code generator 195 for each packet of a data stream comprising sequential data packets as in step 310. Preferably, error code generator 195 generates a 32-bit CRC code but other n-bit CRC codes as well as other error codes, such as parity or Solomon-Reed codes, can be used according to principles of the invention. If the data is to be converted from electrical to optical data, conversion takes place. The stream of optical data packets is transferred over a link and is received in step 320 at a corresponding error checker, preferably a CRC error checker. The CRC checker checks the error code of each data packet in step 330. If there is no error as in step 340, the method inquires as in step 350 if there a CRC error occurred during the transmission of the previous n data packets. If there is no transmission error associated with the current data packet or any of the previous n data packets, the data packet is transferred to the packet receiver for further processing and the error status of that packet is stored in the shift register as in step 370. If there is a transmission error in the current packet as determined in the inquiry of step 340 or if there is an error in at least one of the previous n packets, as in step 350, then the data packet is ignored and the result of the error check is stored in the shift register as in step 360. In either case, the method loops up to step 320 to accept the next data packet and check the error status of the new packet.

In the event that random data has been transmitted and received, it is highly probable that the CRC or other error codes of each packet will not match. Recall, however, that random data produces a packet that passes the CRC check once every 1.2 hours if a packet is transmitted every microsecond when the error code is a 32-bit CRC check. An eight bit shift register to store the error checking results of the previous eight packets has been determined to be sufficient because it is highly improbable that nine consecutive packets of random data having a 32 bit CRC code will be passed through as being acceptable data; in fact the probability is 1 in $(2^{32})^9$ or $2^{288}$ or $4.97832 \times 10^{86}$. At a rate of one packet per microsecond, the likelihood of random data having nine consecutive packets which have good CRC codes will occur in $1.6 \times 10^{73}$ years. Depending upon the error code, the number of bits in the error code, and the number of packets of the error history in the shift register, the integrity of the data can thus be assured.

The invention as embodied herein prevents the acceptance of an error which would otherwise be passed through the CRC checker and provides a technique to detect random data input. Random data is transferred when a differential or an optical receiver is open. If it has been determined that random data is transmitted, the packet receiver can generate a signal indicating that the transceiver providing the data is open and the hub controller or the bridge chip to ignore the data. Other events, e.g., nearby lightning strikes, can produce random data.

While an embodiment of the present invention has been described above, it should be understood that it have been presented by way of example, and not limitation, and variations are possible. A larger or smaller shift register to store the history of error detection which of course would increase or decrease the assurance of data integrity, respectively. Further one can use error detection and correction codes other than the CRC. The number of bits stored in the shift register to determine if the current packet will be accepted can vary. For instance, if only one of the previous n packets has an error, then according to an application requiring high data integrity, the current data packet may be rejected. If data integrity is not so critical, then if the seven (or six or five or any number greater than one) of the previous data packets has an error, the current data packet may be accepted. The invention contemplates that at least one data packet be used as a criteria to reject or accept the current data packet. Thus, the breadth and scope of the present invention should not be limited by any of the above-described exemplary embodiments, but should be defined only in accordance with the following claims and their equivalents.

What is claimed is:

1. A method of error detection in the transfer of data, said method comprising the step of:
   (a) receiving a data packet having an error detection code over a data link;
   (b) checking the error detection code at a data receiver for an error in the transmission of the packet;
   (c) recording the history of the results of step (b);
   (d) repeating step (a) through (c) for n consecutive packets, where n>1 and
   (e) if at least one of the n previous data packets indicates an error in the transmission of the data packet, discard the n+1 data packet.

2. The method of claim 1, wherein the data is optical data and the data link is a fiber optic channel.

3. The method of claim 1, wherein the data is electronic digital data.

4. The method of claim 1, wherein the error detection code is a CRC code.

5. The method of claim 4, wherein the CRC code is a 32 bit CRC code.

6. The method of claim 5, wherein if eight of the previous data packets indicate an error in the error detection code, then determining that the transmitted data is random data.

7. A data communications system comprising:
   (a) a processor connected to at least one data transmission device for the transfer of data in packets having an error code to and from said data transmission device;
   (b) a receiver connected between said processor and said data transmission device, said receiver having an error checker to check the error code for a data transmission error of each data packet;
   (c) a shift register connected to said error checker to store the results of said error checker for each sequential data packet; and
   (d) a packet receiver to accept a current data packet when not only the current data packet has no data transmission error but also at least one of the previous data packets has no data transmission errors.

8. The method of claim 7, wherein said packet receiver rejects said current packet when the current packet has no data transmission error but at least one of the previous data packets has a data transmission error.

9. An apparatus for assuring the integrity of data transmission, comprising:
   (a) means to receive a stream of data packets, each of said data packets having an error code;
   (b) means to check the error code of each data packet as it arrives into said receiver to determine if there is a transmission error for each data packet;
   (c) means to store the results of the error code checking means for n sequential packets;
   (d) means to reject a current data packet when the current data packet has no transmission error but the error code checking means indicates that one of n sequential packets immediately transmitted before said current packet has a transmission error.

* * * * *